Patented Apr. 4, 1939

2,153,141

UNITED STATES PATENT OFFICE 2,153,141

RUBBER COMPOUNDING

Karl H. Engel, West Englewood, N. J., assignor to The Barrett Company, New York, N. Y., a corporation of New Jersey No Drawing. Application April 14, 1936, Serial No. 74,274

8 Claims. (Cl. 106—23)

This invention relates to rubber compounding. The invention is directed more particularly to improvements in rubber compounding softening and/or dispersing agents, to processes for compounding rubber involving the use of improved softening and/or dispersing agents, and to the rubber compounds resulting from the practice of this invention.

Heretofore palm oil, pine tar, mineral rubber, various pitches and tars, and other like materials have been added to the rubber mix for the purpose of dispersing the fillers such as carbon black, zinc oxide, clays, etc., used in rubber compounding. Coal tar distillate oils have also been used in rubber compounding, for example as disclosed in Cowdery et al. U. S. Patent 1,793,161 of February 17, 1931. The present invention is directed especially to improvements in coal tar distillate oil softening and/or dispersing agents and to the utilization of such agents in rubber compounding.

I have found that coal tar distillate oils comprising substantial portions of monomethyl and dimethyl naphthalene fractions and substantially free of oil constituents boiling above about 300° C. possess properties rendering such oils especially suited for use as softening and/or dispersing agents in rubber compounding. These oils, when substantially free of crystalline material at 25° C., have a specific gravity of about 0.95 to about 1.03 at 15.5° C., boil above about 200° C., and boil substantially dry at about 300° C., i. e., are substantially free of oil constituents boiling above about 300° C. The preferred oils selected are coal tar oils comprising predominantly monomethyl and dimethyl naphthalene fractions, and are substantially free of low boiling naphthalene fraction, of oil constituents boiling above about 300° C., and of tar acids and tar bases. The preferred oils are likewise substantially free of crystalline material at 25° C., have a specific gravity of about 1.0 to about 1.03 at 15.5° C., boil above about 230° C., boil substantially dry at about 300° C., and contain not more than about 0.5% each of tar acids and tar bases. Following is a specification for preferred coal tar distillate oils.

Specific gravity_____ 1.005–1.025 at 15.5° C.
Distillation:
    To 230° C_____ None
    To 235° C_____ Not over 5%
    To 250° C_____ 50 to 80%
    To 280° C_____ Not less than 95%
    Dry_____ Not above 300° C.
Tar acids_____ Not over 0.3%
Tar bases_____ Not over 0.3%

Following is an example of the procedure which may be employed in the manufacture of the oils of the invention.

Crude coal tar is distilled and the first 15 to 20% of the distillate obtained constitutes the fraction known in the art as carbolic oil. This oil is treated in the usual way with acid and alkali to recover tar bases and tar acids. The residual oil, after recovery of tar acids and bases may be cooled, settled and filtered to insure absence of crystalline material. This residual oil, which may be termed extracted carbolic oil, is distilled and a fraction boiling between about 200° C. and about 300° C. is recovered. This distillate, which may for convenience be termed "limpid oil", is a relatively clear oil, substantially free of crystalline material at 25° C., and has a color ranging from light yellow through light brown to brownish red. The limpid oils have a specific gravity ranging from about 0.95 to about 1.03 at 15.5° C. and contain substantial portions of alpha and beta monomethyl naphthalene (boiling over the range about 220° C. to about 245° C.) and isomeric dimethyl naphthalenes (boiling over the range of about 245° C. to about 275° C.). The oils contain substantially no oil constituents boiling over about 300° C. While such limpid oils are satisfactory for the purposes of the invention, it is preferred to select oils containing little or none of the naphthalene fraction boiling below about 220° C.–230° C. and to obtain best results it is preferable to select fractions boiling above about 220° C.–230° C.

and containing no oil constituents boiling above 300° C. Such fractions have a specific gravity of about 1.00 to about 1.03 at 15.5° C. and contain predominating proportions of mono and dimethyl naphthalene fractions. For reasons subsequently indicated, the preferred oils of the invention are practically free of tar acids and tar bases, i. e., they should not contain more than about 0.5% each of these substances. The limpid oils described may contain appreciable amounts of tar acids and tar bases, and hence in accordance with the invention it is preferred to subject the limpid oils to suitable refining treatment to remove tar acids and tar bases.

Purification or refining of the limpid oils may be effected by treatment with sulfuric acid of suitable concentration to bring about removal of tar bases, after which treatment the acid oil may be neutralized and washed with a solution of a caustic alkali of such strength and in such amount as to effect the desired removal of tar acids. If desired, an additional treatment of the oil with relatively strong sulfuric acid of about 66° Bé. strength or other polymerizing catalysts such as aluminum chloride, etc. may be employed (after the primary sulfuric acid treatment) to effect removal of unsaturated compounds from the oils. However, such treatment of the oils for removal of unsaturated compounds is not essential. Upon completion of the chemical treatment the oils may be washed free from alkali by suitable water washes and then, if desired, the oils may be distilled to produce lighter colored oils approaching water white. In connection with water washing, since the specific gravities of water and the oils of the present invention are close, water washing may not be carried out to advantage at ordinary temperatures. At higher temperatures, the oils, having a considerably greater expansion coefficient than water, rise readily to the surface. It is preferred, therefore, after the neutralizing treatment with caustic soda, to wash the oils with water at temperature between about 80° C. and about 90° C.

The following example is illustrative of a process for purifying the limpid oils of this invention, the parts referred to therein being by volume:

100 parts of limpid oil may be agitated with three successive portions of about 8 parts each of sulfuric acid having a concentration of about 50° Bé., the oil being decanted from the sulfuric acid solution at the end of each wash to separate the acid sludge. If it should be desired to remove unsaturated compounds which may be present in small percentages, such compounds may be polymerized at this point by treating the oil with about 1.5–2.0 parts of 66° Bé. H₂SO₄, and separating the acid sludge. The acid oil obtained from treatment with sulfuric acid may be neutralized with about 3 parts of a 25 per cent solution of caustic soda, the mixture allowed to settle and the oil decanted from the subnatant alkali solution. The alkali-treated oil may be then washed twice with water at a temperature of about 90° C. after which treatment the oil and water may be separated and the oil redistilled.

Rubber compounds or articles containing the improved softening and/or dispersing agents of the invention may be formed by any of the usual or well known methods of rubber compounding.

To illustrate advantages of the invention, results of a series of tests carried out in accordance with standard and well known methods of the rubber industry are shown below. In these tests, a rubber compound was milled with the same quantity of different dispersing agents as indicated below and a comparison made between the physical characteristic of the resulting compounds after curing. The dispersing agents used were pine tar, a petroleum oil having an initial boiling point of about 275° C. and predominating in constituents boiling above 300° C., which oil has been widely used as a rubber softener, and a preferred refined limpid oil of the present invention having a specific gravity of about 0.995.

The composition of the rubber stocks was as follows, parts being by weight:

Rubber Stock

|  | Parts |
|---|---|
| Sheet rubber | 100 |
| Softener | 5 |
| Carbon black | 45 |
| Zinc oxide | 5 |
| Stearic acid | 4 |
| Agerite powder | 1 |
| Sulfur | 2.75 |
| Captax | 1 |
|  | 163.75 |

The compositions were milled, and then cured at 281° F.

Results of tests

|  | Pine tar | High boiling pet. oil | Refined limpid oil |
|---|---|---|---|
| Tensile strength_____pounds__ | 4,310 | 4,210 | 4,340 |
| Elongation_____percent__ | 640 | 640 | 670 |
| Hardness (Shore)_____ | 65 | 65 | 64 |
| Plasticity (Adams)_____ | 78 | 78 | 82 |
| Abrasion (Grasselli)_____ | 166 | 137 | 130 |
| Abrasion (Kelly-Springfield)____ | 235 | 230 | 235 |
| Percentage drop in tensile strength after aging for 2 weeks at 70° C_____percent__ | 18.1 | 20.6 | 12.9 |
| Tear (Winkelmann): | | | |
| Long_____pounds__ | 51.5 | 59.3 | 67.5 |
| Trans_____do__ | 54.8 | 62.8 | 68.3 |
| Fatigue (Firestone-De Mattia Mach. 300 cycles 100 percent maximum elongation): | | | |
| Checked at_____hours__ | 3.5 | 4.5 | 4.5 |
| Broke_____do__ | 4.0 | 6.25 | 7.0 |

The above data show the oils of the invention possess superior softening and/or dispersing properties as compared with softening and/or dispersing agents used in the industry.

The improved oils flux with rubber very readily during milling. Milling tests show the oils penetrate and plasticize the rubber to a marked degree, and are appreciably better than prior products in accelerating the breakdown of rubber, thus shortening the mill time and reducing power consumption. The oils only slightly accelerate the rate of cure. The above data show the oils afford increased resistance to wear, provide better tearing resistance, and are more resistant to checking. The percentage of drop in tensile strength after aging indicates rubber compositions containing the oils have improved aging qualities.

Some of the major advantages afforded by the preferred softening and/or dispersing agents of the invention are attributable to the absence from the oils of pyrogenous decomposition products, tar acids and tar bases, and relatively low boiling naphthalene. Elimination from the oils of pyrogenous decomposition products, present in oils containing constituents boiling above about 300° C., and elimination of tar acids and tar bases not only result in production of oils having improved softening and/or dispersing properties but also provide oils containing substantially no constituents imparting objectionable coloring to green or aged stocks. The invention accordingly makes available oils which not only possess improved softening and/or dispersing properties but which, on account of the absence of coloring constituents, may be employed in the manufacture of light colored or white stocks.

The oils are lighter colored than prior generally similar softening and/or dispersing agents, are transparent, and range in color from substantially water white to pale yellow through straw color to light brown to brownish red. Tests show the oils do not discolor white or light colored stocks and do not cause any appreciable discoloration of these stocks on aging. This characteristic of the oils of the invention constitutes a substantial commercial advantage in the art as compared with prior generally similar softening and/or dispersing agents. The absence in the improved oils of constituents imparting objectionable coloring to rubber stocks is believed to be almost wholly caused by elimination from the oils of tar acids and tar bases and of pyrogenous decomposition products present in distillates containing constituents boiling above about 300° C.

Some previous coal tar oil softening and/or dispersing agents are obtained by heating coal tar oils at such temperatures as to produce distillates containing substantial amounts of constituents boiling above 300° C. Distillation of coal tar oils at temperatures high enough to produce such distillates causes the presence of thermal or pyrogenous decomposition products in the distillates recovered. The improved oils of the present invention are practically free of decomposition products, are not dark colored, do not impart dark coloring to white or light colored rubber stocks even after aging, and do not create objectionable odors during the manufacture of the stocks or in the finished products. Elimination in the oils of the invention of pyrogenous decomposition products boiling above 300° C. accounts for the absence of objectionable odors both in the finished products, and during manufacture thereof, and for the absence in finished products of initial or developed discoloration.

Tar bases mainly tend to accelerate and tar acids to some extent tend to retard the rate of cure. Both cause discoloration of the oil during storage and of the rubber stocks, and unpredictable effects on the rate of vulcanization. In accordance with the preferred embodiment of the invention, tar acids and tar bases are removed to a point where they have no adverse effect on rate of vulcanization or rate of cure and do not discolor stocks. For this purpose tar acids and tar bases are removed to such extent that the oils contain not more than about 0.5% of each. The elimination of these materials forms products of uniform and dependable quality with respect to rate of vulcanization and rate of cure. Removal of tar acids and tar bases to the degree specified also extracts constituents that might cause later discoloration from the oils producing clear, transparent oils and improves color stability of such oils.

The preferred oils are substantially free of naphthalene fraction boiling below 220-230° C. Absence of the lighter naphthalene fraction from the oils eliminates from the rubber compounding operation objectionable naphthalene fumes and does away with residual naphthalene odor in the finished rubber goods.

I claim:

1. A composition comprising rubber compounded with coal tar oil containing substantial portions of monomethyl and dimethyl naphthalene fractions and being substantially free of oil constituents boiling above about 300° C.

2. A composition comprising rubber compounded with coal tar oil containing substantial portions of monomethyl and dimethyl naphthalene fractions, not more than about 0.5% each of tar acids and tar bases, and being substantially free of naphthalene fraction and of oil constituents boiling above about 300° C.

3. A composition comprising rubber compounded with coal tar oil containing substantial portions of monomethyl and dimethyl naphthalene fractions, having a specific gravity of about 0.95 to about 1.03 at 15.5° C., and being substantially free of oil constituents boiling above about 300° C.

4. The step in the process of compounding rubber which comprises incorporating in the rubber mix coal tar oil containing substantial portions of monomethyl and dimethyl naphthalene fractions and being substantially free of oil constituents boiling above about 300° C.

5. The step in the process of compounding rubber which comprises incorporating in the rubber mix coal tar oil containing substantial portions of monomethyl and dimethyl naphthalene fractions, not more than about 0.5% each of tar acids and tar bases, and substantially free of naphthalene fraction and of oil constituents boiling above about 300° C.

6. The step in the process of compounding rubber which comprises incorporating in the rubber mix coal tar oil containing substantial portions of monomethyl and dimethyl naphthalene fractions, having a specific gravity of about 0.95 to about 1.03 at 15.5° C., and being substantially free of oil constituents boiling above about 300° C.

7. A composition comprising rubber compounded with light-colored, limpid oil comprising predominantly monomethyl and dimethyl naphthalene fractions, said oil being substantially free of naphthalene fractions boiling below about 220° C. and substantially free of oil boiling above about 300° C., said oil containing not more than about 0.5% each of tar acids and tar bases, and having a specific gravity of about 0.95 to about 1.03 at 15.5° C.

8. The step in the process of compounding rubber which comprises incorporating in the rubber mix light-colored, limpid oil comprising predominantly monomethyl and dimethyl naphthalene fractions, said oil being substantially free of naphthalene fractions boiling below about 220° C. and substantially free of oil boiling above about 300° C., said oil containing not more than about 0.5% each of tar acids and tar bases, and having a specific gravity of about 0.95 to about 1.03 at 15.5° C.

KARL H. ENGEL.